US010182329B1

(12) United States Patent
Roths

(10) Patent No.: US 10,182,329 B1
(45) Date of Patent: Jan. 15, 2019

(54) QUARANTINE NETWORK FOR WIRELESS DEVICES

(71) Applicant: Amazon Technologies, Inc., Seattle, WA (US)

(72) Inventor: Andrew Jay Roths, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/691,391

(22) Filed: Aug. 30, 2017

(51) Int. Cl.
*H04W 4/80* (2018.01)
*H04W 40/24* (2009.01)
*H04W 12/04* (2009.01)
*H04W 84/18* (2009.01)

(52) U.S. Cl.
CPC ............. *H04W 4/80* (2018.02); *H04W 12/04* (2013.01); *H04W 40/244* (2013.01); *H04W 84/18* (2013.01)

(58) Field of Classification Search
CPC ..... H04W 12/04; H04W 40/244; H04W 4/80; H04W 12/12; H04W 76/10; H04W 76/20; H04W 76/30; H04W 76/34; H04W 76/00; H04W 8/005; H04W 8/30; H04W 16/20; H04W 24/04; H04W 24/08; H04W 48/18; H04W 60/00; H04W 60/04; H04W 60/06; H04L 63/14; H04L 63/1441; H04L 29/06877
See application file for complete search history.

(56) References Cited

U.S. PATENT DOCUMENTS

| 9,654,458 B1* | 5/2017 | Bhaktwatsalam .. H04L 63/0876 |
| 10,064,062 B2* | 8/2018 | Idnani .................... H04W 12/08 |
| 2004/0028016 A1* | 2/2004 | Billhartz ............... H04L 63/123 370/338 |
| 2004/0053622 A1* | 3/2004 | Nakakita ............. H04L 63/0428 455/450 |
| 2004/0212503 A1* | 10/2004 | Stilp .................... G06K 7/0008 340/572.1 |
| 2004/0215750 A1* | 10/2004 | Stilp .................... G06K 7/0008 709/220 |
| 2006/0132303 A1* | 6/2006 | Stilp ........................ G05B 9/03 340/539.22 |
| 2006/0145842 A1* | 7/2006 | Stilp ........................ G05B 9/03 340/539.22 |

(Continued)

*Primary Examiner* — Devan Sandiford
(74) *Attorney, Agent, or Firm* — Quarles and Brady

(57) ABSTRACT

A system and method for a quarantine network for a personal area network are provided. A plurality of devices that are connected to a first personal area network are identified. A first device is designated as being authorized to communicate using the first personal area network and a second device of the plurality of devices is designated as not being authorized to communicate using the first personal area network. The first device is instructed to disconnect from the first personal area network. Communications with the second device are ceased. After ceasing communication with the second device, the second device continues to be connected to the first personal area network. It is then determined that the first device is connected to a second personal area network. The first device is instructed the first device to use a network key for communications with a network controller.

20 Claims, 12 Drawing Sheets

(56) References Cited

U.S. PATENT DOCUMENTS

| | | | |
|---|---|---|---|
| 2010/0150063 A1* | 6/2010 | Lee ....................... | H04W 99/00 370/328 |
| 2010/0205312 A1* | 8/2010 | Yasuma .............. | H04L 12/2838 709/228 |
| 2012/0029717 A1* | 2/2012 | Cox ......................... | H02J 3/14 700/295 |
| 2012/0036250 A1* | 2/2012 | Vaswani ................ | G01D 4/004 709/224 |
| 2012/0084440 A1* | 4/2012 | Stahlin .................. | H04L 67/306 709/224 |
| 2012/0124373 A1* | 5/2012 | Dangoor ............... | H04L 63/062 713/168 |
| 2012/0299509 A1* | 11/2012 | Lee ..................... | H04L 41/0806 315/291 |
| 2012/0304297 A1* | 11/2012 | Chung ................ | H04L 63/1416 726/23 |
| 2014/0325586 A1* | 10/2014 | Halliday ............... | H04W 12/12 726/1 |
| 2015/0334676 A1* | 11/2015 | Hart ...................... | H04W 4/029 455/456.1 |
| 2016/0127931 A1* | 5/2016 | Baxley .................. | G01S 5/0263 455/67.16 |
| 2016/0248774 A1* | 8/2016 | Kawamura ............. | H04W 4/80 |
| 2016/0373270 A1* | 12/2016 | Yang ..................... | H04W 12/06 |
| 2017/0134556 A1* | 5/2017 | Webster ............ | H04M 1/72533 |
| 2018/0006723 A1* | 1/2018 | Noh ..................... | H04B 10/116 |
| 2018/0176876 A1* | 6/2018 | Alam ................... | H04W 60/00 |

\* cited by examiner

QUARANTINE NETWORK FOR WIRELESS DEVICES

BACKGROUND

The present invention relates generally to the field of personal area networks (PANs) and, more particularly, to a method for managing devices connected to a PAN. An increasing number of devices are configured to connect to networks in order to exchange information. A device may join a network after being configured with network credentials, such as a network key. Several standards have been developed to govern the communications of devices participating in such networks. ZIGBEE, for example, is a wireless networking standard for low power, low data rate, and lost cost applications. In general, devices implementing the ZIGBEE standard are suited for automation, control, monitoring, and sensing applications in which data is transmitted infrequently at low rates from battery-powered devices. Typical ZIGBEE devices may include home automation devices, such as smart lightbulbs, home security monitoring system, heating and cooling (e.g., heating, ventilation, and air conditioning (HVAC)) control systems, and the like.

The ZIGBEE protocol builds upon the Institute of Electrical and Electronics Engineers (IEEE) 802.15.4 standard. The IEEE standard defines a short range, low power, low data rate wireless interface for small devices that have constrained power, CPU, and memory resources. ZIGBEE is an open standard that allows ad hoc networking so that devices can be easily added and removed from existing networks.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
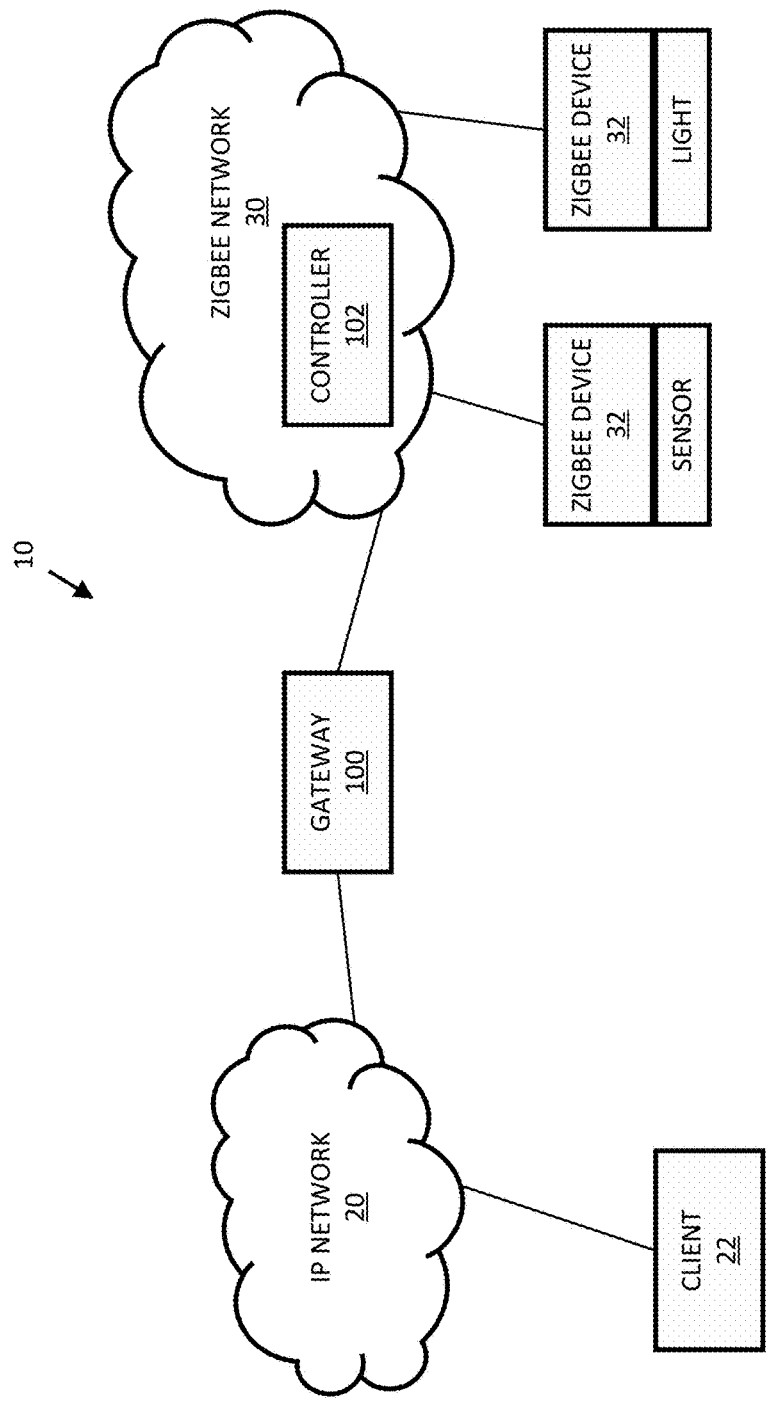
FIG. 1 depicts an example communication network that may be operated in accordance with the present disclosure.

A network allows two or more devices to communicate with one another and exchange information. Devices providing a wide variety of functionality can be configured to connect to one or more networks. The devices may include televisions, tablet computers, personal computers, electronic book readers, gaming consoles, set-top boxes, media players, vehicles, portable media players, smartphones, home automation devices, security systems, appliances, access points, routers, home automation devices (e.g., smart lightbulbs, home security monitoring system, and heating and cooling (e.g., heating, ventilation, and air conditioning (HVAC)) control systems), sensors, identification tags, and so forth. The networks may include local area networks ("LANs") or personal area networks ("PANs"), for example. A LAN may use protocols compliant with at least a portion of the 802.11 standards promulgated by the Institute of Electrical and Electronic Engineers ("IEEE"). A PAN may communicate using the BLUETOOTH standard as promulgated by the BLUETOOTH Special Interest Group, or the ZIGBEE standard, for example.

Some networks may require connected devices to be configured with network credentials or a network key in order to join and participate within the network. These network credentials may include one or more of a network name, a password, an encryption type, an encryption key, and so forth. Devices that have the proper credentials may then be authenticated enabling them to join to the network and communicate securely with other devices that have connected to or joined the network.

Different types of networks may implement different procedures for admitting new devices into the network. Some network types, for example, may require a user to manually enter a network key or security code into a device before the device will be admitted into the network (i.e., connecting to the network thereby enabling the device to communicate using the network). In such cases, the network key may be required to be shared directly between individuals, thereby ensuring the confidentiality of the network key and security of the network. Other networks types, however, do not put such limitations on devices before devices can join a particular network.

When adding devices to a ZIGBEE network, for example, a network controller first puts the network into a permit-join mode. With the network is in permit-join mode, the network controller broadcasts a beacon signal indicating that the network is open to new devices joining the network. Any ZIGBEE-compatible devices that receive the beacon signal and that are themselves configured in a join mode will connect to the network by issuing an association request to the network controller in response to the beacon signal. This association request is a request by the ZIGBEE device to be connected to the network controller's network.

In response to the association request, the network controller transmits response messages that cause the device to connect to the network and communicates the network's security key to the device or otherwise identifies the network key. The ZIGBEE device, now connected to the network, uses that network key to secure its communications with the network controller. Additionally, once connected to the network, individual ZIGBEE devices on the network, depending upon their configuration, may be able to communicate directly with one another.

The connection process may include the ZIGBEE device broadcasting information describing itself, such as the device's Internet Protocol (IP) address, media access control (MAC) address, and other identifying information, to other devices on the network enabling the other devices to more effectively communicate with the device and route communications amongst themselves.

This network behavior results in any ZIGBEE devices that are in join mode in proximity to the network controller (or other router devices that may re-broadcast the controller's beacon signals) that receive the beacon signal to automatically join the network. Being in join mode, the devices will simply receive the beacon signal and connect to the network. This behavior can simplify the process for connecting devices to a ZIGBEE network.

Rather than manually having to enter a security key into the ZIGBEE device, which could be difficult in the case of a smart lightbulb or sensor which would include only a minimal user interface, a user has only to place the device into a join mode (e.g., by pressing a single button on the device). The device will then automatically detect an available network and connect, with little additional user input. Unfortunately, this behavior can also be problematic for two reasons.

First, unwanted devices may unintentionally be added to the network. For example, if a user of a ZIGBEE network wishes to add a new ZIGBEE device to their network (e.g., a newly purchased smart lightbulb), the user will first cause the network controller to put the network into a permit-join mode and the smart lightbulb into join mode. At that time, the new smart lightbulb will detect the network beacon signal and, in turn, be added to the network. Additionally, however, any other in-range ZIGBEE devices that are also in join mode and receive the network's beacon signal will also connect to the network. If a neighbor, for example, has also purchased a number of ZIGBEE devices that are all in their respective join modes and in range of the controller's beacon signal, when the user's ZIGBEE network is placed into the permit-join mode, all those other devices will connect to the network too.

In general, any ZIGBEE device that requests to join the network while the network is in permit-join mode will be admitted to the network and provided the network's network key. This is an automated process with, effectively, no vetting or confirmation process by the network or network controller or any user before the devices are added to the network. Although the duration of permit-join mode for a particular network may be time-limited (e.g., there may be a specific time window during which the network will stay in permit-join mode before leaving permit-join mode or the user may manually turn off permit-join mode), during that time several unwanted device may be able to join the network.

Although this may often result from inadvertent error (e.g., a nearby and unwanted device happening to be in join mode at the same time the network is placed into permit-join mode), there is some risk that unwanted devices may be added to a ZIGBEE network with, potentially, malicious intent. Once a malicious device is admitted into the network, that device may be able to intercept communications between the other devices that are connected to the same network. In the case of a network serving a home automation devices, this may allow the malicious device to access data related to a security or other home automation device connected to the network. As such, it could be beneficial to manage a ZIGBEE network in a manner that allows more control over which devices are ultimately connected to the network.

In some cases, it may be possible to transmit a request directly to an unwanted device asking that the unwanted device leave the network. But in many cases such a request may be ignored or otherwise ineffective. The unwanted device may have a bug so that the device ignores the request, or may otherwise want to remain connected to the network (i.e., the device may be malicious). In such a case, it may be necessary to tear down the network in order to create a new network to which the wanted devices can connect. Tearing down the network may involve ceasing communicating via the network and instead generating a new network with a new network key. But even in that case, the unwanted devices may simply re-connect to the new network recreating the original problem.

In the present system, to mitigate these and other problems, when setting up a new network, the network controller is configured to first setup a temporary "quarantine" network. The quarantine network is placed into a permit-join mode and nearby devices that are in join mode are permitted to join the quarantine network.

As discussed above, following the broadcast of the beacon signal for the quarantine network a number of different wanted and unwanted devices may have connected to the network. At that time, the network controller may provide a user (e.g., the individual managing the network) with a list of the devices that have connected to the quarantine network. The user can then review the list of devices to determine whether unwanted devices have connected to the network.

If all the devices appear to be wanted devices (i.e., it is the user's intent that all the devices be connected to the network), the user provides a notification of the same to the network controller. Having determined that all connected devices are wanted devices, the network controller can then issue a rotate key command, thereby providing each of the connected devices with a new network key enabling the devices to be connected to a permanent (or at least semi-permanent) network hosted by the network controller that replaces the quarantine network.

In contrast, if the user indicates that a number of unwanted devices have connected to the quarantine network, the network controller will instruct the wanted devices, which were identified by the user, to leave the quarantine network by issuing a leave command to the device. The wanted devices will then disconnect from the network, forget the network key and cease communication via the quarantine network. After instructing the wanted devices to leave the quarantine network, only the unwanted devices will be left on the temporary quarantine network.

At this time, the network controller ceases communications via the quarantine network, but the unwanted devices will remain connected to the quarantine network, effecting stranding those devices on the quarantine network.

Having removed the wanted devices from the quarantine network, the network controller can setup a new quarantine network with a new network key and the user will again put the wanted devices into join mode (alternatively, the devices may automatically re-enter a join mode). With the new quarantine network put into permit-join mode, the wanted devices will connect to the new quarantine network. The unwanted devices should not join the new quarantine network because, as described above, the unwanted devices have been stranded (i.e., left connected) to the original quarantine network. That is, the unwanted devices are connected to the old quarantine network and will continue trying to communicate using that network rather than seeking out a new network to connect to.

When the user confirms that only wanted devices have connected to the new quarantine network, the network controller can then issue a command to the devices connected to the new quarantine network, thereby providing each of the connected devices with a new network key enabling the devices to connect to a permanent (or at least semi-permanent) network hosted by the network controller.

In this manner, unwanted devices that may otherwise automatically join the ZIGBEE network can be constrained to and stranded on a quarantine network, while the wanted devices can be identified and then transitioned into the permanent network being hosted by the network controller. This enables a user to filter which devices connect to the user's network.

It should be noted that the PAN configuration and, specifically, ZIGBEE implementations described herein are introduced as an example embodiment. The present quarantine network implementation described herein may apply to any communications network in which devices are configured to join a communications network identified by a beacon signal. In such a system, a quarantine network configuration in accordance with the present disclosure may be utilized as a staging network to identify wanted and unwanted devices and transition the wanted devices into a semi-permanent network, while leaving the unwanted devices stranded on the quarantine network. The present quarantine network can therefore apply to networks such as 802.11-based LANs and other, similarly configured, communications networks.

FIG. 1 depicts an example communication network 10 that may be operated in accordance with the present disclosure. Communication network 10 includes an IP network 20 to which an IP client 22 is attached, and a ZIGBEE network 30 with one or more ZIGBEE devices 32. The ZIGBEE standard specifies protocols for a personal area network (PAN) and is well suited for sensing, automation, and control applications. The present invention, however, may be used with other types of PANs and is not limited to ZIGBEE networks. A gateway 100 connects ZIGBEE network 30 with the IP network 20 and allows IP clients 22 residing in the IP network 20 to communicate with ZIGBEE devices 32 in the ZIGBEE network 30. In some embodiments of a ZIGBEE network, for example, the functionality provided by gateway 100 and network controller 102 may be incorporated together into a single device or network component, though in other embodiments, different network devices (e.g., separate computing devices) may provide the functionality of gateway 100 and controller 102. For example, if the ZIGBEE devices 32 include a number of home automation devices (e.g., smart lightbulbs, home security monitoring systems, and HVAC controllers), IP client 22 may include computer systems, such as computers, laptops, and mobile devices configured to communicate with those ZIGBEE devices 32 to retrieve data therefrom or to configure or otherwise interact with ZIGBEE devices 32.

Gateway 100 includes an IP interface device for interfacing with the IP network 20, a ZIGBEE interface device for interfacing with the ZIGBEE network 30, and gateway 100 to route communications between IP network 20 and ZIGBEE network 30. The IP interface device may include, for example, an Ethernet adapter, IEEE 802.11.x wireless interface adapter, or cellular transceiver. The ZIGBEE interface device may include an IEE 802.15.4 wireless interface adapter. Gateway 100 may include an IP controller to control the IP interface device and a ZIGBEE controller to control the ZIGBEE interface device. Gateway 100 may be implemented as software on one or more programmable processors with associated memory, either internal or external, for storing data and applications needed for operation.

The ZIGBEE standard is built upon the Institute of Electrical and Electronics Engineers (IEEE) 802.15.4 standard that defines a short-range, low-power, low-data rate wireless interface for small devices with limited power, CPU, and memory resources. The ZIGBEE standard comprises a set of network and application-level protocols to enable networking between ZIGBEE devices 32. The ZIGBEE devices 32 comprise nodes within the ZIGBEE network 30.

With ZIGBEE network 30 there are three types of nodes: controller, router, and end device. The various nodes may be interconnected in a star topology, tree topology, or mesh topology. Regardless of the network topology, each ZIGBEE network 30 comprises one controller 102. Controller 102 is responsible for setting up and managing the ZIGBEE network 30 to which the other nodes may join. In some embodiments, the controller may also maintain binding tables for routing of messages between various nodes or devices 32 of the ZIGBEE network 30.

A ZIGBEE network 30 that uses a tree or mesh topology requires the presence of at least one router (not shown in FIG. 1). In such a network configuration, the router relays messages from one node in the ZIGBEE network 30 to another and allows child nodes to connect to the router. A router acts as a local coordinator for end devices joining the ZIGBEE network 30. End devices typically host one or more applications to perform specified tasks. For example, end devices may have applications to collect and report data, and to control home devices such as lights within the home.

Within a ZIGBEE network 30, each node is identified by a unique address. A ZIGBEE network 30 may employ two addressing schemes, with each node having a long address and a short address. The long address, also called the IEEE address or MAC address, is a 64-bit address allocated by the IEEE, which uniquely identifies the node. The short address, also referred to as the network address, is a 16-bit address that identifies the nodes of the ZIGBEE network 30 to the network controller 102. Network addresses are allocated by a controller or router when a node joins the ZIGBEE network 30.

A ZIGBEE device 32 may host one or more user applications. For example, there may be one application in the network 30 to monitor temperature and humidity. Such applications are referred to as endpoints on the ZIGBEE device 32. These applications may send and receive messages to other applications either inside or outside of the ZIGBEE network 30.

In order to direct messages arriving at a device 32 to the appropriate application, each endpoint is identified by an endpoint address. Endpoint addresses are similar to ports in IP addresses. A device 32 may have up to 240 applications or endpoints numbered from 1-240. Endpoint 255 is a broadcast endpoint address. Messages addressed to endpoint 255 will be delivered to all applications on the node.

The ZIGBEE standard includes a discovery mechanism that enables ZIGBEE devices 32 in the network to discover the address and capabilities of other devices 32 in network 30. Device discovery enables ZIGBEE devices 32 to query network 30 (and, specifically, controller 102) to discover the network addresses of other devices 32 on network 30. Service discovery allows a ZIGBEE device 32 to request information about the capabilities of another ZIGBEE device 32.

Service information can be stored as descriptors and may include information such as the device type and capabilities of a ZIGBEE device 32, and the types of applications running on the ZIGBEE device 32. There are three mandatory descriptors and two optional descriptors stored in a ZIGBEE device 32. The mandatory descriptors are the node, node power, and simple descriptors. The optional descriptors are called the complex and user descriptors. For each ZIGBEE device 32, there is only one node and node power descriptor. For each application attached to an endpoint, there is a simple descriptor and possibly a complex descriptor and/or user descriptor.

The node descriptor describes the type (i.e., controller, router, or end device) and capabilities of the ZIGBEE device 32. The capabilities of a ZIGBEE device 32 or node are properties such as the frequency band in use, and the maximum buffer size. The power descriptor contains information about how the device 32 is powered. Such information may include the power mode (i.e., whether the device is on at all times or wakes up periodically), the available power sources, the current power sources in use, and the current power source level. The simple descriptor contains information about an application attached to the endpoint of a ZIGBEE device 32. This information includes the endpoint address that the application resides on, the application profile that the application implements, and lists of input and output clusters supported. The simple descriptor also indicates whether there are corresponding complex and user descriptors.

Figure 2:
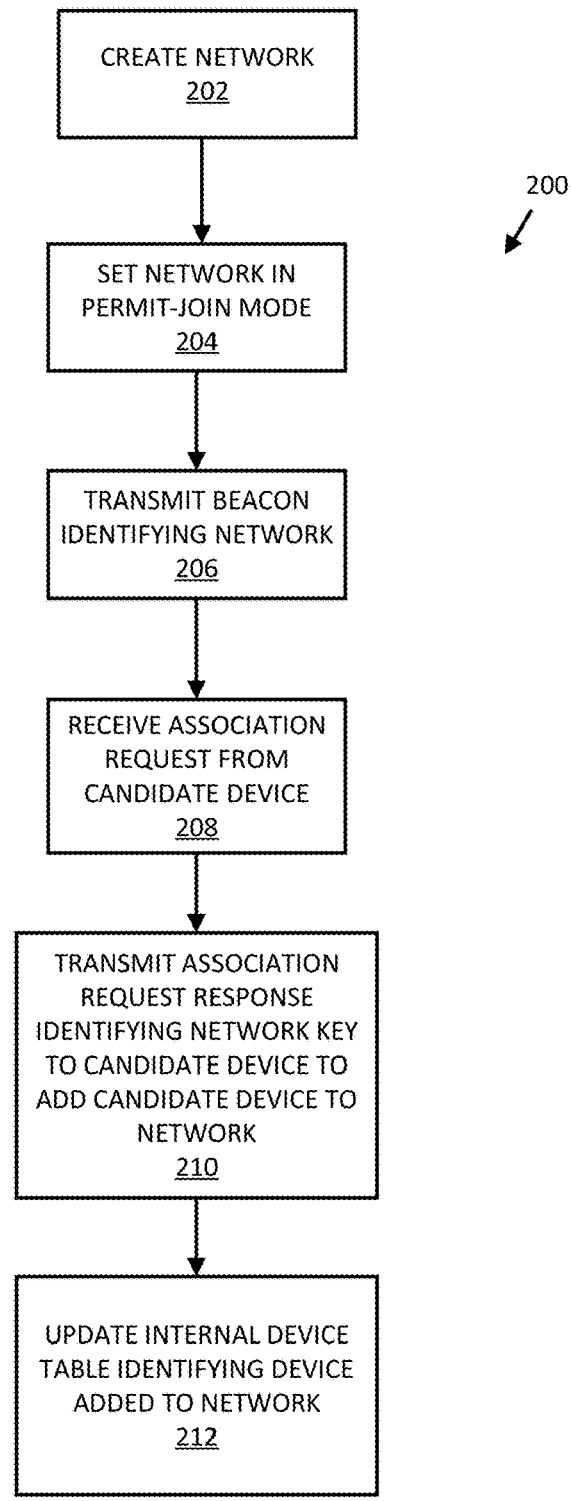
FIG. 2 is a flowchart that may be implemented by a network controller to add new devices to a network, such as a PAN implementing the ZIGBEE standard.
Figure 3A:
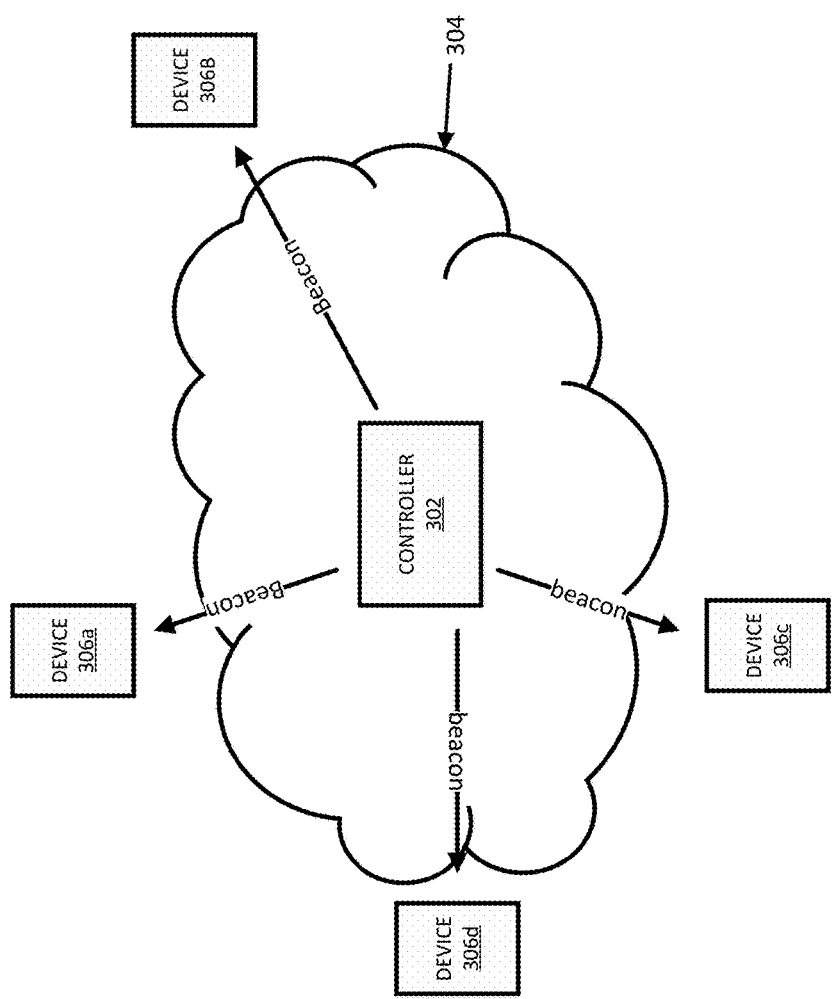
FIGS. 3A and 3B are illustrations depicting components of the network as a network controller implements the method of FIG. 2.
Figure 3B:
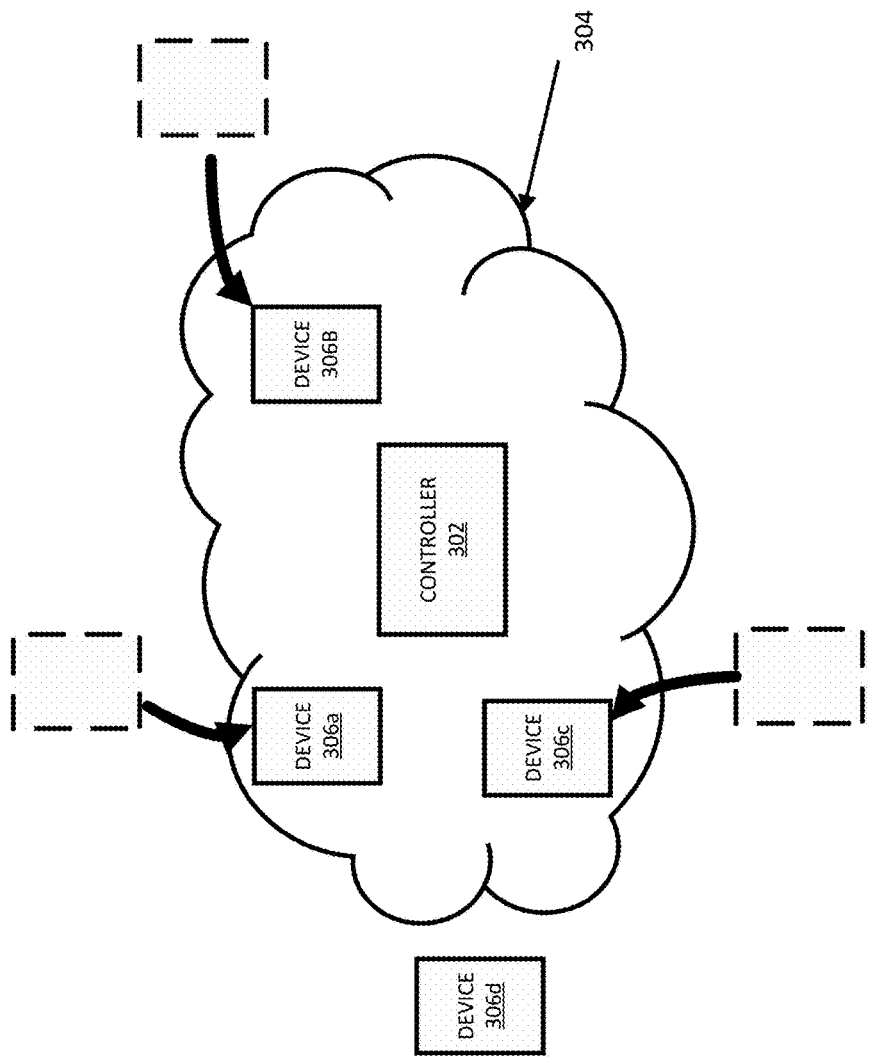

As described above, with a PAN, the network controller manages network operations and, specifically, controls the process by which new devices are added to the network. To illustrate this process, FIG. 2 is a flowchart that may be implemented by a network controller to add new devices to a network, such as a PAN implementing the ZIGBEE standard. FIGS. 3A and 3B are illustrations depicting components of the network as the controller implements method 200 of FIG. 2. Method 200 of FIG. 2 may be implemented, for example, by controller 302 depicted in FIGS. 3A and 3B.

Referring to method 200, in step 202 controller 302 first creates network 304 to which devices may be added. This involves first identifying a wireless communication channel to be utilized by network 304. With the channel selected, the network controller can specify an identification for network 304, as well as a network key or security credential for network 304. In a ZIGBEE network, the name of the network can be referred to as that network's PAN ID and may be a hexadecimal value identifying the network. Additional settings for network 304, such as the capacity of the network to support routers, a security scheme utilized by the network, and the like, may also be established at this time.

With network 304 created, the settings defining network 304 may be stored in a memory accessible to controller 302. FIG. 3A depicts network 304 having been defined by controller 302 of network 304.

In step 204, controller 302 sets network 304 into a permit-join mode. The permit-join mode may last indefinitely (e.g., until an operator of network 304 cancels the permit-join mode), for a pre-determined amount of time, or until a particular trigger event occurs, such as a predetermined number of devices joining or attempting to join network 304. When network 304 is in permit-join mode, devices are allowed to connect to network 304. If network 304 is not in permit-join mode, controller 302 will ignore requests from devices to the join network 304.

With network 304 in permit-join mode, in step 206 controller 302 broadcasts a beacon signal indicating that network 304 is in permit-join mode. The beacon signal may include, for example, the PAN ID of network 304, an indication that network 304 is in permit-join mode, and a description of the security routines implemented by network 304.

Controller 302 broadcasts the beacon signal wirelessly through a suitable interface, such as a radio or wireless transceiver. Referring to FIG. 3A, the beacon signal being broadcast by controller 302 is depicted by the arrows emanating from controller 302.

In some cases, the beacon signal may be broadcast by controller 302 without any prior communications with any of devices 306. For example, when network 304 is first placed into join mode, controller 302 may, at that time, initiate broadcast of the beacon signal. In some cases, however, controller 302 may broadcast the beacon signal in response to a request from one or more of devices 306. For example, a device 306, having recently been put into a join mode, may broadcast its own signal requesting identification of any networks within signal range that are in permit join modes. This process may be referred to as network discovery and may be performed, for example, when the device 306 is first powered on.

The beacon signal transmitted by controller 302 may be received by a number of devices 306 (e.g., ZIGBEE devices) in sufficient proximity to controller 302 to receive and decode the broadcast beacon signal. As described above, devices 306 (including devices 306a-306d) may include devices such as smart light bulbs, HVAC controllers, and the like, configured to communicate with controller 302 and participate within network 304.

Devices 306 may respond differently to the broadcast beacon signal depending upon the current state of devices 306. If, for example, a device 306 is not currently set in a mode that causes the device to join an available network (e.g., the device is not in a join mode), the device 306 may simply ignore the beacon signal upon receipt.

Conversely, if a device 306 is in join mode (i.e., the device is actively looking for networks to join), the device 306 will join network 304 upon receipt of the beacon signal. In this example, devices 306a, 306b, and 306c are in join mode, while device 306d is not in join mode. Accordingly, upon receipt of the beacon signal, devices 306a-306c will respond by transmitting join requests to controller 302 requesting access to network 304.

Accordingly, in step 208 of FIG. 2, after broadcasting the beacon signal, controller 302 receives an association request from a device 306 wishing to join network 304. In this example, controller 302 will receive association requests from each of devices 306a-306c, but no association request from device 306d, which was not in join mode when the beacon signal was transmitted. The association request received from devices 306a-306c includes an identification of the device 306 issuing the association request. In a ZIGBEE network, an association request may be transmitted as part of the device connecting to the network implementing a MAC association process.

After receipt of the association request from a particular device 306, controller 302 will add that device to the network 304. Specifically, in step 210 of method 200, controller 302 transmits an association request response to the device 306 from which the association request was received in step 208. The association request response includes a network address that has been assigned to the connecting device. The device can then use that network address in communicating via network 304. A network key to use in securing communications with the controller 302 can then be transmitted to the device 306.

In step 212, network controller 302 may update one or more database tables that store records identifying the device 306 that has connected to network 304 as well as the network address that was allocated to the connected device 306. In an embodiment, the database tables may resemble routing tables that enable network controller 302 to more efficiently route communications between devices 306 connected to network 304.

Conversely, after receiving the association request responses from controller 302, each device 306 joining network 304 may update its own internal routing tables within a storage memory of the devices 306 that specify, for network 304, the new network address that was assigned to the device 306, the identification of network 304 (e.g., the PAN ID), and an entry specifying that the new parent of the device 306 is controller 302 (this, in turn, indicates that the device 306 has now connected to network 304). At this point, the device 306 may instruct one or more applications of the device 306 that the device 306 has now connected to a network and that those applications can begin communicating via network 304.

Finally, after a device 306 has connected to network 304, the device 306 may broadcast an announcement via network 304 informing other devices 306 that have connected to network 304 that the device 306 has connected to network 304. This announcement may include the device 306's network address (e.g., a 16-bit network address value) and, optionally, a device identifier, such as that device's 64-bit IEEE address (i.e., a MAC address for the device 306). This announcement may be useful, because if the device 306 was previously connected to network 304 at a different time with a different network address, the other devices 306 of network 304 may store old information for that device 306 in their own internal routing tables. But, after receiving this announcement, those other devices can determine from the updated address value in the announcement that the device has re-connected to the network and been allocated a new address. Those devices can then clear references to that device's old network address from their own internal routing tables. Additionally, once transmitted, the network address information contained within the announcement can be added to the routing tables of all other devices 306 that are connected to network 304 to facilitate the routing of communications through network 304 between devices 306.

The network join process is depicted in FIG. 3B, in which devices 306a, 306b, and 306c, which were all in join mode prior to controller 302 transmitting the beacon signal, have all connected to network 304 (indicated by their being positioned within the boundary of network 304). But device 306d, not being in join mode at the time the beacon signal was transmitted, has not connected to network 304. And so in FIG. 3B, device 306d resides outside the boundary of network 304.

According to method 200, therefore, any device 306 that is in a join mode and receives the beacon signal transmitted by controller 302 will join the network 304, even if such a device 306 is unwanted and not intended to be joining or communicating via network 304. This can result in problems where unwanted devices (or even malicious devices) may join networks and then be able to communicate with one or more of the other devices that are also connected to the same network. This can result in potential user frustration and security implications as the unwanted devices may have unintended access to communications and/or data occurring within network 304.

To mitigate these issues, an approach is provided in which a temporary quarantine network is used to stage a number of devices wishing to join a PAN. If all the devices that join the quarantine network are wanted devices, then those devices can be transitioned into the permanent (or at least semi-permanent) network. If, however, one or more of the devices that join the quarantine network are unwanted devices, wanted devices will be instructed to leave the quarantine network and join a new quarantine network, effectively stranding the unwanted devices on the original quarantine network. The wanted devices can then be transitioned into the permanent network.

Figure 4:
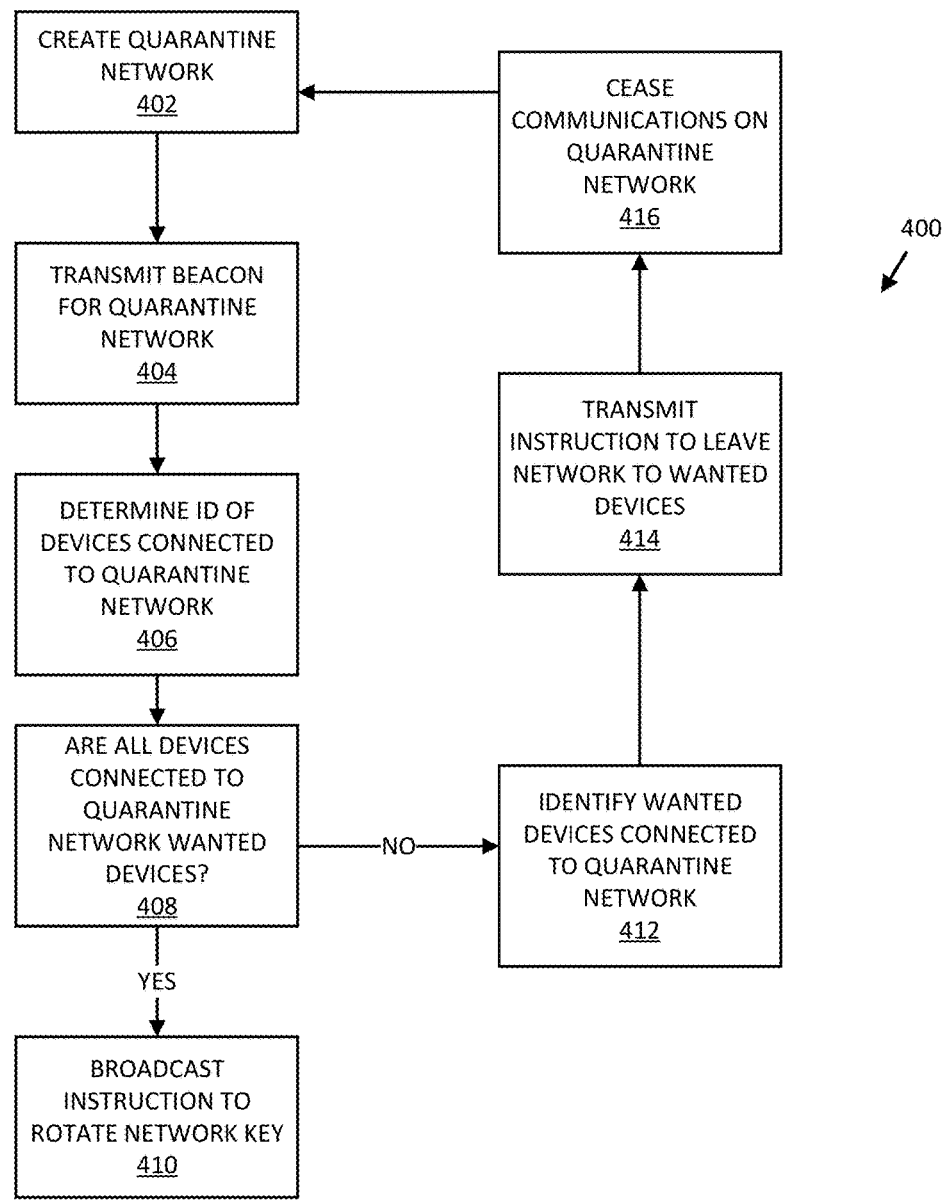
FIG. 4 is a flowchart depicting a method for implementing a quarantine network in accordance with the present disclosure.

FIG. 4 is a flowchart depicting method 400 for implementing a quarantine network in accordance with the present disclosure. The method may be implemented by, for example, a network controller (e.g., controller 102 of FIG. 1). FIGS. 5A-5D are illustrations depicting components of the network as the controller implements method 400 of FIG. 4. In this example, method 400 of FIG. 4 may be implemented, for example, by controller 502 depicted in FIGS. 5A-5D.

Figure 5A:
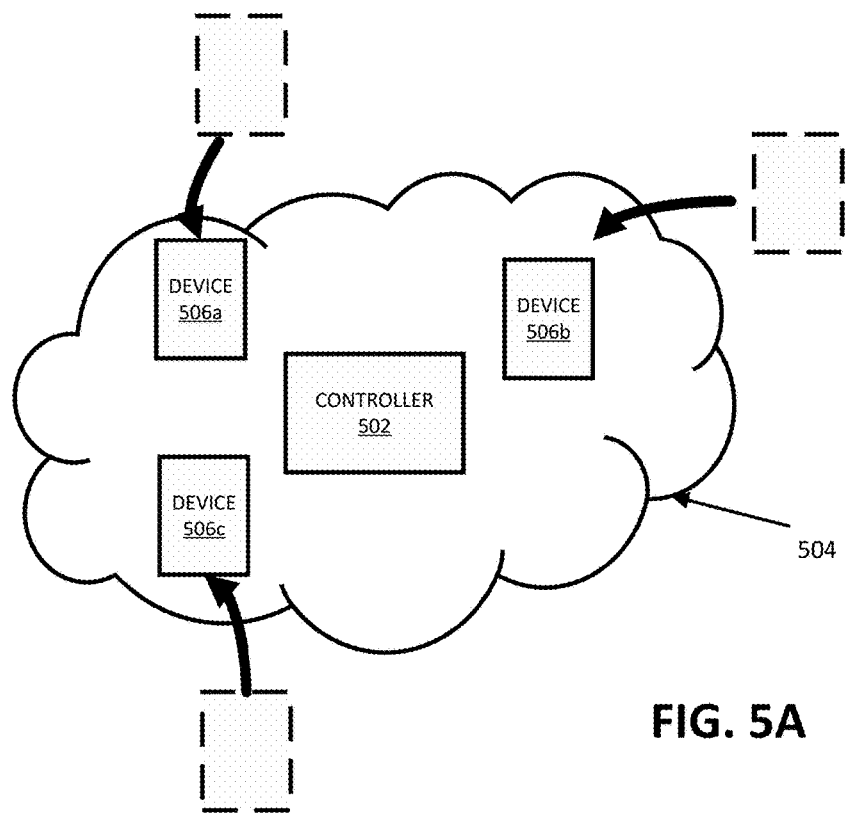
FIGS. 5A-5D are illustrations depicting components of the network as a network controller implements the method of FIG. 4.

In step 402 controller 502 first creates a quarantine network 504 to which devices may be added. This may involve controller 502 identifying an appropriate communication channel for network 504 and then defining quarantine network 504 by specifying an identification for that network, as well as a network key or security credential for the network. In a ZIGBEE network, the name of the network can be referred to as that network's PAN ID and may be a hexadecimal value identifying the network. Once created, the settings defining quarantine network 504 may be stored in a memory accessible to controller 502. FIG. 5A depicts quarantine network 504 having been defined by controller 502 of network 504.

Once created, controller 502 sets quarantine network 504 into a permit-join mode. The permit-join mode may last indefinitely (e.g., until an operator of network 504 cancels the permit-join mode), for a pre-determined amount of time, or until a particular trigger occurs, such as a predetermined number of devices joining or attempting to join network 504. When quarantine network 504 is in permit-join mode, devices 506 are allowed to connect to network 504. If quarantine network 504 is not in permit-join mode, controller 502 will ignore requests from devices 506 to the join quarantine network 504.

With quarantine network 504 in permit-join mode, in step 404 controller 502 broadcasts a beacon signal indicating that quarantine network 504 is in permit-join mode. Controller 502 broadcasts the beacon signal wirelessly through a suitable interface, such as a wireless or radio transceiver. The beacon signal includes an identification of quarantine network 504 (e.g., the PAN ID). The beacon signal may be broadcast by controller 502 without any prior communications with any of devices 506. For example, when network 504 is first placed into join mode, controller 502 may, at that time, initiate broadcast of the beacon signal. In some cases, however, controller 502 may broadcast the beacon signal in response to a request from one or more of devices 506. For example, a device 506, having recently been put into a join mode, may broadcast its own signal requesting identification of any networks within signal range that are in permit join modes. This process may be referred to as network discovery and may be performed, for example, when the device 506 is first powered on.

The beacon signal transmitted by controller 502 may be received by a number of devices 506 (e.g., ZIGBEE devices) in sufficient proximity to controller 502 to receive and decode the broadcast beacon signal. As described above, devices 506 (including devices 506a-506c) may include devices such as smart light bulbs, HVAC controllers, and the like, configured to communicate with controller 502 and participate within network 504.

Devices 506 may respond differently to the broadcast beacon signal depending upon the current state of devices

506. If, for example, a device 506 is not currently set in a mode that causes the device to join an available network (e.g., the device is not in a join mode), the device 506 may simply ignore the broadcast signal upon receipt. Conversely, if a device 506 is in join mode (i.e., the device is actively looking for networks to join), the device 506 will join network 504 upon receipt of the beacon signal. In this example, all devices 506 are in join mode. Upon receipt of the beacon signal, devices 506 will respond by transmitting join requests to controller 502 requesting access to network 504. Accordingly, after broadcasting the beacon signal in step 404 a number of devices 506 will join network 504. This is depicted in FIG. 5A with devices 506a-506c joining (and being depicted moving into) network 504.

At this point, a number of devices 506 have connected to network 504, but it is unknown whether all devices 506 were intended to be part of network 504 or whether some devices 506 connected unintentionally. As discussed above, some devices 506 may have connected unintentionally if they happened to be in a join mode when the beacon signal was broadcast by controller 502. In other cases, devices 506 may be malicious devices and may have connected to network 504 without the permission of the operator of network 504.

Accordingly, in step 406 controller 502 identifies the devices that connected to quarantine network 504 after the beacon signal was transmitted. This may involve controller 502 first turning off permit-join mode for network 504 and then inspecting the controller's network records (e.g., a routing table identifying devices 506 connected to network 504) to determine network addresses for each of devices 506 that connected to quarantine network 504.

With the network addresses of devices 506 identified, controller 502 can begin identifying devices 506. For example, controller 502 may request from each of devices 506 a copy of the device's application profile file. As described above, the application profile file provides descriptive information about the device, such as the type of device, as well as a description of the model and/or functionality provided by the device 506. If the device is a home automation device, for example, the device may have a home automation profile file that describes attributes of the device, such as the type of device, as well as a description of the manufacturer, model and/or functionality provided by the device 506, the manufacturer of device 506, a power level of device 506, a list of functions provided by device 506, and the like. Controller 502 may retrieve from each connected device 506 all or part of a file containing the device 506's home automation profile. In some embodiments, the profile file may be signed according to a public key scheme by a manufacturer of the device. Upon receipt of the profile file, the public key used to sign the profile file may be utilized to confirm the authenticity of the profile file, as well as the fact that the profile file was signed and distributed by the manufacturer. This confirmation may be undertaken according to conventional approaches for confirming the authenticity of a file signed with a public key.

In some cases, controller 502 may identify a MAC address of each connected device 506. MAC addresses are unique addresses assigned to each device 506, in which blocks of MAC addresses are associated with particular manufacturers. Furthermore, particular segments of a MAC address may be used by particular manufacturers to identify groups or types of devices distributed by the manufacturer. If controller 502 is provided access to a database that maps MAC addresses (or portions of MAC addresses) to particular manufacturers and, optionally, device descriptions, the MAC address of a particular device 506 may be used to determine a description and, potentially, an identification of that device. An example of such a mapping is provided below. In Table 1, portions of a MAC address are mapped to a particular manufacturer identifications. Portions of the MAC address that do not relate to a particular manufacturer ID are replaced with X's that may match any value in the MAC address of the device. In an embodiment, the organizationally unique identifier contained with the MAC address is used to map to a particular manufacturer name, while the remainder of the MAC address is replaced with X values.

TABLE 1

| MAC Address | Manufacturer |
| --- | --- |
| 75849XXXXXXXXXXX | Manufacturer Name 1 |
| 37629XXXXXXXXXXX | Manufacturer Name 2 |
| 1A7BFXXXXXXXXXXX | Manufacturer Name 3 |
| 190ACXXXXXXXXXXX | Manufacturer Name 4 |
| BCD45XXXXXXXXXXX | Manufacturer Name 5 |

In some cases, controller 502, as part of the identification process, may be configured to interact with a device 506 to determine whether the device 506 provides particular functionality. If a particular device 506, for example, provide functionality for modifying a temperature setting, controller 502 may be configured to determine that such a device can be identified as an HVAC controller. In an embodiment, controller 502 accesses a look-up table that relates particular device 506 functionality to device 506 identities. In such a case, by identifying particular functions provided by a device 506, controller 502 can map those available functions to a particular device identity in the look-up table. An example table that maps particular device 506 functionality to a device description is depicted below in Table 2.

TABLE 2

| Functionality | Device Description |
| --- | --- |
| Modify Temperature | Thermostat |
| Change output color | Smart lightbulb |
| Skip song | Speaker system |

With devices 506 identified, in step 408 controller 502 determines whether each of the devices 506 connected to network 504 are wanted devices. In the present disclosure, a wanted device is a device that is designated as being authorized to communicate using network 504. Devices may be designated as authorized, for example, by a user, as described herein. In some embodiments, controller 402 may be configured to automatically determine whether a particular device is wanted by determining whether that device is designated as being authorized to communicate using the first personal area network. Similarly, devices that are unwanted are not designated as being authorized to communicate using the first personal area network. Typically, the user or operator of network 504 will be the user responsible for designating which devices are wanted or unwanted. In an embodiment, this step relies upon feedback of an operator of network 504 to indicate which devices 506 are wanted and which devices 506 are unwanted. In some cases, controller 502 may be configured to automatically determine that a particular device 506 is unwanted. For example, in a particular network 504, particular classes or types of devices may always be designated as unwanted. For example, in a home network, devices that are classified as industrial sensors may default to being designated as unwanted devices on network 504. In still other embodiments, the user may scan a barcode or other identifier of the device being added to the network. An ID encoded in that barcode would then be transmitted by the scanning device to controller 502, enabling controller 502 identify the wanted device. In some cases, a purchase history of the user may be utilized to further identify devices that the user has recently purchased and that are likely to be wanted devices on network 504. For example, controller 502 may generate a user interface displaying, for each connected device 506, a listing that shows the identity of each device 506 that was determined in step 406. The user can then provide feedback through that interface to indicate which devices 506 are wanted devices and which are unwanted devices.

Figure 6:
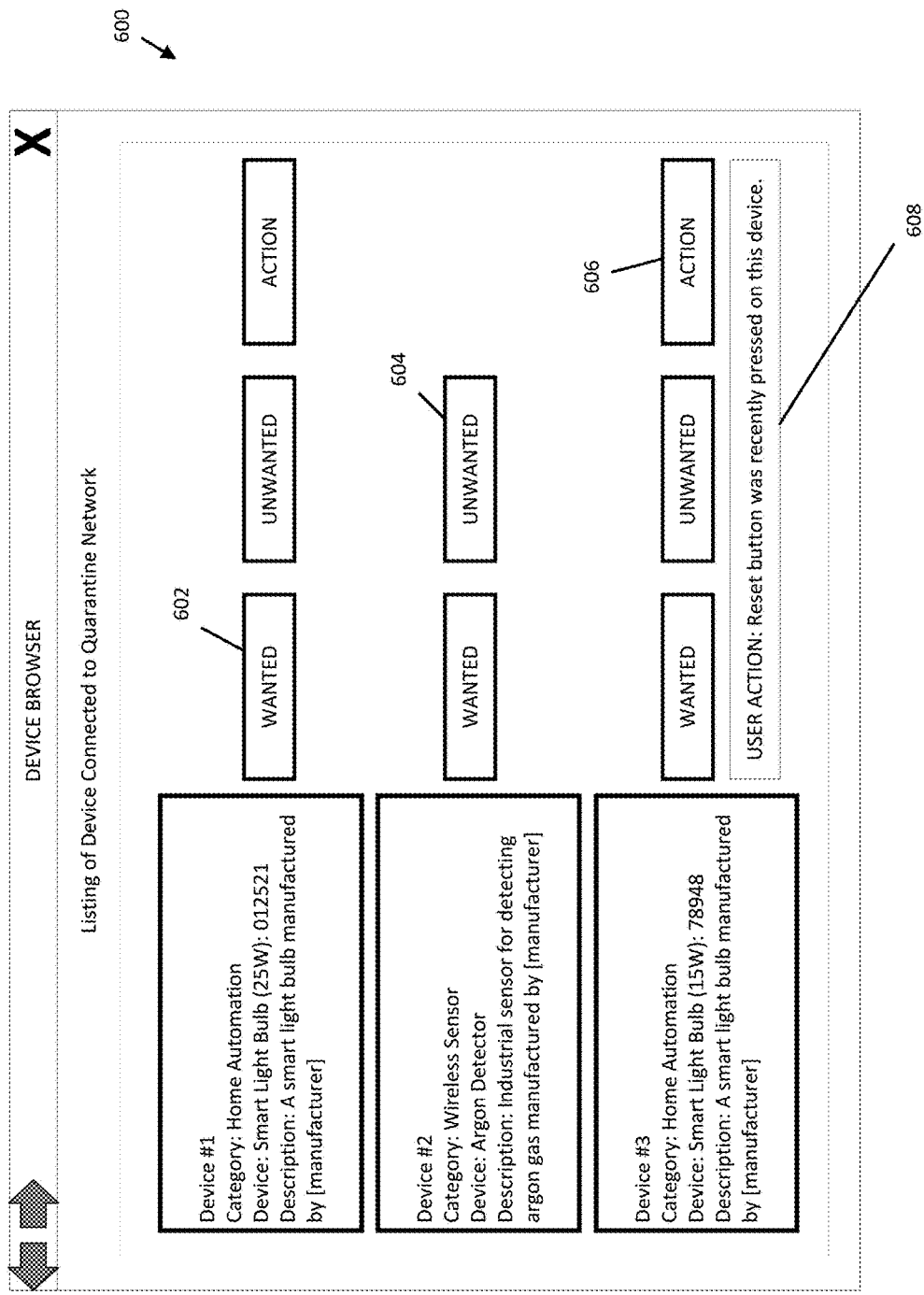
FIG. 6 depicts a sample user interface that a network controller may utilize to solicit feedback from an operator of a quarantine network to identify unwanted and wanted devices.

For example, FIG. 6 depicts a sample user interface that controller 502 may utilize to solicit feedback from an operator of quarantine network 504 to identify unwanted and wanted devices. In an embodiment, the user interface of FIG. 6 may be provided or transmitted to and displayed on a suitable computing system (e.g., a computer connected to controller 502 through a suitable IP gateway such as gateway 100 of FIG. 1) accessible to the operator. The user interface could be, for example, a web page hosted by controller 502 and accessed by a computer of the network operator though other types of user interface may be utilized and displayed using other devices. In some embodiments, controller 502 may be configured to display the user interface and directly receive feedback from the network operator.

User interface 600 displays, for each of devices 506 connected to quarantine network 504, a description of the device 506. The description may be derived from, for example, the identity information gathered by controller 502 from each device 506 in step 406 of method 400. By reviewing the information provided by user interface 600, the operator should be able to determine which of the listed devices should be included in the network. And, conversely, the operator should be able to identify unwanted devices, which may be unknown devices in the listing, or devices that the operator specifically knows to be unwanted.

For example, if the operator has recently attempted to add a smart light bulb to network 504, the operator could, after reviewing the information provided in user interface 600 determine that the first device listed is the recently purchased lightbulb and activate interface element 602 to indicate that that particular device is a wanted device.

Conversely, the operator, upon reviewing the information of user interface 600 may determine that the second device, an industrial sensor, for example, is not a device that the operator wishes to incorporate into the network (e.g., the operator may simply not recognize the device). In that case, the operator can activate interface element 604 to indicate that the second device listed in user interface 600 is unwanted.

In some cases, the device descriptions provided in user interface 600 may be inadequate for the operator to determine whether a particular device is wanted or not. For example, the operator may have attempted to add a single smart lightbulb to the network, but the listing in user interface 600 may indicate that multiple smart lightbulbs connected to quarantine network 504. In that case, for certain types of devices 506, user interface 600 may include an action interface element 606. Upon receiving an indication that the user has activated the action interface element 606, controller 502 may be configured to transmit an instruction to the associated device 506 instructing the device 506 to take some action (e.g., generate a visual or audible output signal) that may be detected by an individual in proximity to the device 506. Again, a database record or look-up table accessible to controller 502 may provide a list of user-perceivable actions or outputs (e.g., output signals, such as illuminated LEDs, played sounds, displayed messages, and the like) that particular types of devices 506 may be able to generate. For example, in the case of a light bulb, the action interface element may cause the device to illuminate or blink the light bulb for a period of time (e.g., 5 seconds) or output a particular color light. If the device is a thermostat, for example, the action interface element may cause the device to display a particular message on the screen of the thermostat. If the device is instructed to display a particular message or code (e.g., a string of characters), for example, the code that the device was instructed to display could be included in the description of the device as found in user interface 600 enabling the user to identify wanted devices by confirming that the device is displaying the code included in the device description of user interface 600. Similarly, if the device is a wireless speaker (or other device incorporating a speaker), for example, the action interface element may cause the device to output a sound.

By selectively activating the action interface elements 606 for the different devices 506 depicted in user interface 600, a user can determine which of the devices listed in user interface 600 are wanted and which are not. For example, if the operator wishes to add a smart light bulb to the network, but user interface 600 lists two identical (or almost identical) light bulbs, the operator can activate the action interface element 606 for the first light bulb listed in user interface 600. If the light bulb the operator wishes to add to the network does not flash, then the operator can mark that device as unwanted. If, upon activating the action interface element 606 for the next light bulb listed, the light bulb the operator wishes to add flashes, the operator can indicate that device is wanted (e.g., by activating interface element 602).

If devices 506 includes mechanisms that enable some form of user input to be provided through the device, that user input can be detected and displayed on user interface 600 to further assist a user in identifying wanted and unwanted devices. For example, if device 506 is a thermostat, enabling a user to provide an input of a selected temperature, controller 502 may encode into user interface 600 a message indicating the temperature that the thermostat device is current set to. The user can then modify the set temperature on the thermostat device they wish to add to network 504 and, by seeing a corresponding change for a thermostat device on the user interface, can determine which thermostat is the wanted device. In the example of user interface 600, device 506 may include a smart lightbulb that includes a reset button. To assist in identifying the wanted lightbulb, the user can press the reset button, that action of which will be detected by controller 502 and displayed on user interface 600 (see message 608). The user can then quickly determine which of the two lightbulb devices is the wanted device 506.

In this manner, the wanted and unwanted devices 506 of quarantine network 504 can be identified. After the operator has indicated whether the devices listed in user interface 600 are wanted or unwanted, that information can be provided back to controller 502 in a suitable-encoded transmission (e.g., via gateway 100 of FIG. 1).

In step 408 the controller 502 determines whether all devices 506 connected to network 504 are wanted devices (e.g., based upon the operator's feedback through user interface 600). If so, in step 410 controller 502 transmits an instruction to all devices 506 connected to quarantine network 504 to provide those devices 506 with a new network key (i.e., to rotate their network keys) to replace the original quarantine network key the devices 506 utilized when connected originally to quarantine network 504. This transitions those devices 506 out of quarantine network 504 and into a permanent (or at least semi-permanent) network. At that time, quarantine network 504 can be torn down.

Figure 5B:
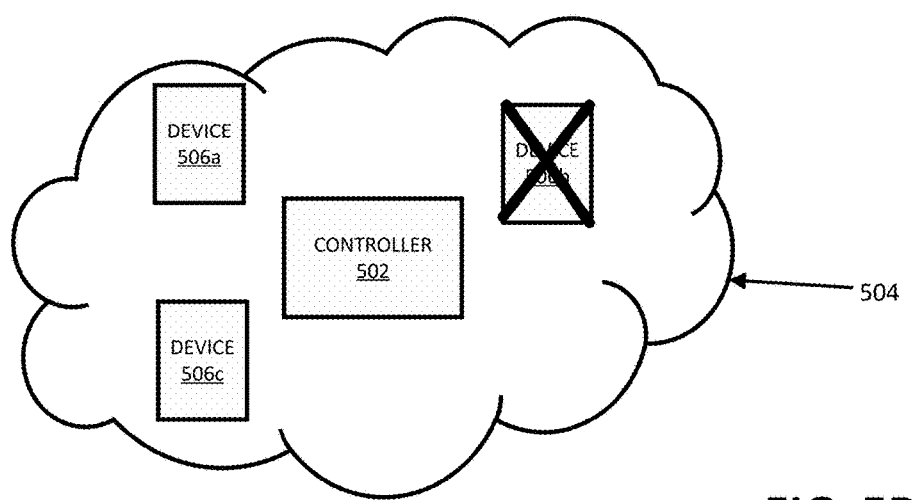

But, if in step 408 controller 502 determines that not all of the devices 506 connected to quarantine network 504 are wanted devices, method 400 moves on to step 412 in which the wanted devices are identified. With reference to FIG. 5B, in this example, devices 506a and 506c were determined to be wanted device, while device 506b is unwanted.

With the wanted devices identified, in step 414 controller 502 instructs the wanted devices 506a and 506c to leave quarantine network 504 by selectively issuing a leave network command to devices 506a and 506c. Upon receiving the instruction to leave quarantine network 504, devices 506a and 506c will disconnect from network 504, thereby ceasing communications via quarantine network 504. Device 506b, which was unwanted, however, will stay connected to quarantine network 504.

In step 416, controller 502 ceases communications with quarantine network 504. This effectively strands the unwanted device 506b on quarantine network 504. This is depicted in FIG. 5C, which shows devices 506a and 506b exiting quarantine network 504, while unwanted device 506b continues to participate in quarantine network 504.

Method 400 then repeats.

Figure 5C:
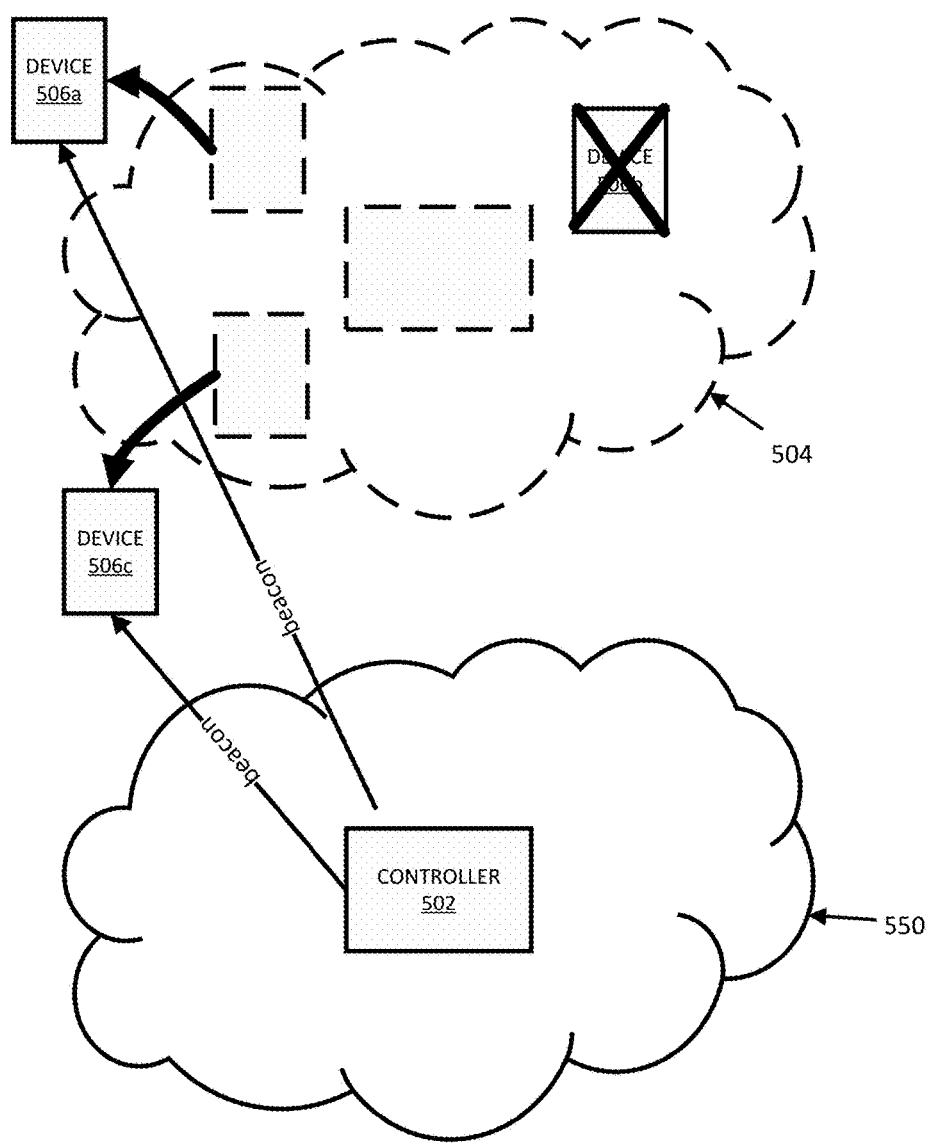

In the second iteration of step 402, controller 502 creates a new quarantine network 550, as shown on FIG. 5C. Controller 502 will then transmit a new broadcast beacon signal in the second iteration of step 404, which will be received by devices 506a and 506c. Devices 506a and 506c may have automatically transitioned into join mode after leaving quarantine network 504 or, in an embodiment, the operator may have placed devices 506a and 506c into join mode manually.

Figure 5D:
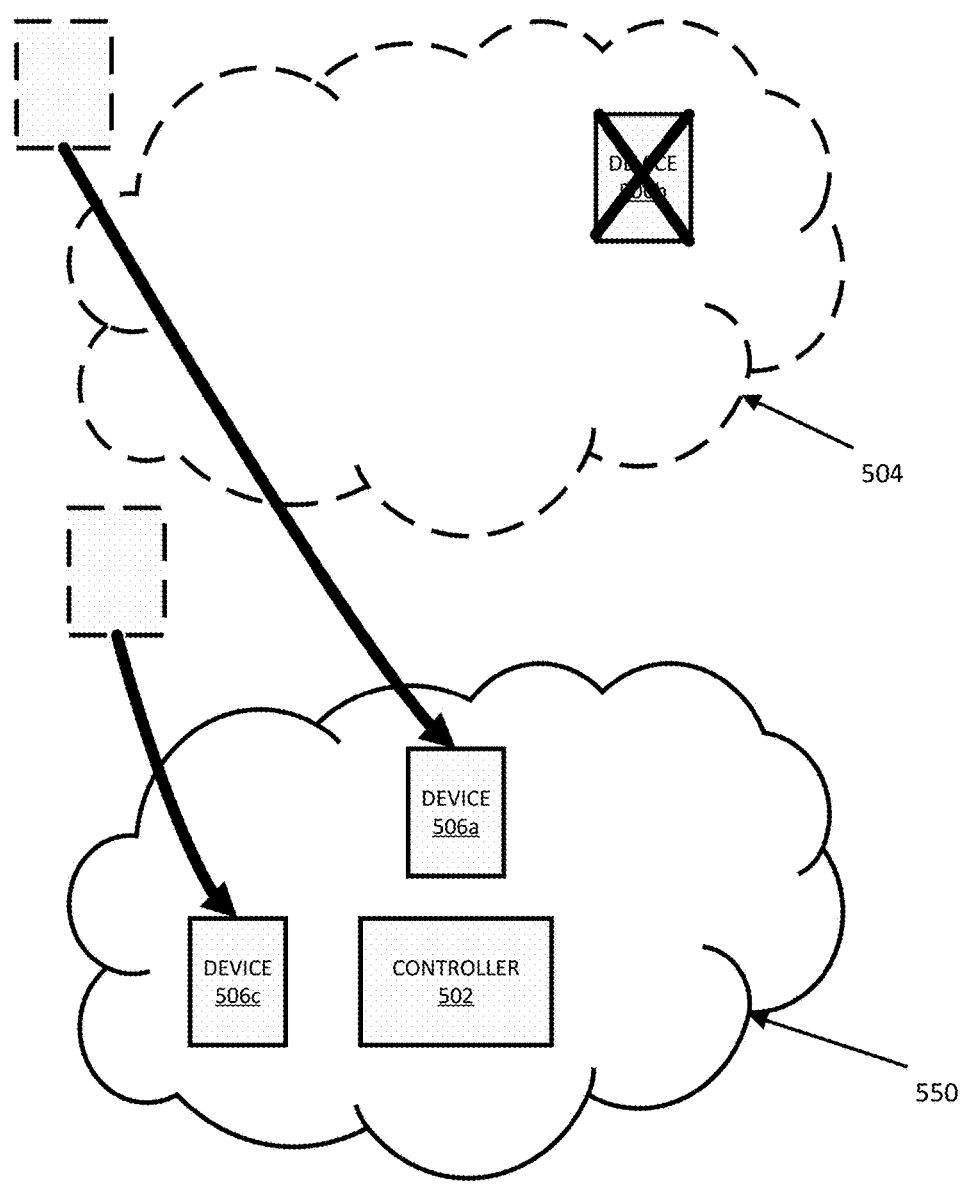

Upon receipt of the second beacon signal, devices 506a and 506c will join the new quarantine network 550 as depicted in FIG. 5D. Unwanted device 506b will not join the new quarantine network 550, even in response to the beacon signal, because unwanted device 506b is already connected to quarantine network 504.

In the second iteration of step 406, controller 502 determines the identification of the devices 506a and 506c connected to new quarantine network 500 and in step 408 determines whether all devices connected to new quarantine network 550 are wanted devices. The second iterations of steps 406 and 408 may be performed in a similar manner by controller 502 to that of the first iterations of steps 406 and 408.

In this example, only the wanted devices 506a and 506c connected to new quarantine network 550 (the unwanted device 506b was stranded on quarantine network 504). As such, controller executes step 410 and transmits an instruction to all devices 506 (i.e., devices 506a and 506c) connected to new quarantine network 550 to use a new network key (e.g., to rotate their network keys). This effectively transitions those devices 506 into a permanent (or at least semi-permanent) network. At this time, controller 502 may determine that there are no unwanted devices 506 connected to network 550 as only wanted devices 506a and 506c have connected to network 550. The unwanted device 506b is still connected to quarantine network 504. Furthermore, at this time, controller 502 may set network 550 into a mode of operation that does not allow new devices to join network 550 (i.e., network 550 will exit permit join mode). This prevents unwanted devices from again joining network 550.

If, however, in the second iteration of step 408 it was determined that there are still unwanted devices connected to the network, the method would again be repeated. Method 400 may be repeated many times until only wanted devices remain in the most current quarantine network.

Accordingly, by implementing method 400 a network controller uses an initial, temporary quarantine network as a staging area in which to accumulate candidate devices that wish to join the network. Those devices can then be identified and inspected to determine whether they are wanted or unwanted devices. Wanted devices are then transitioned into a second quarantine network, effectively stranding the unwanted devices on the original quarantine network.

In an alternative approach, rather than generate multiple quarantine networks that enable the prevention of unwanted devices joining a network, wanted and unwanted devices within a quarantine network are identified. Then, a new network key is provided only to the wanted devices, while leaving the unwanted devices using the original quarantine network key that was established when the quarantine network was originally setup. Using the new network key, the wanted devices can communicate freely via the network and the unwanted devices, not utilizing the new network key, will be unable to communicate with either the wanted devices or the network controller. This approach, therefore, enables the wanted devices to be separated from one another in a manner that prevents communication between wanted and unwanted devices.

Figure 7:
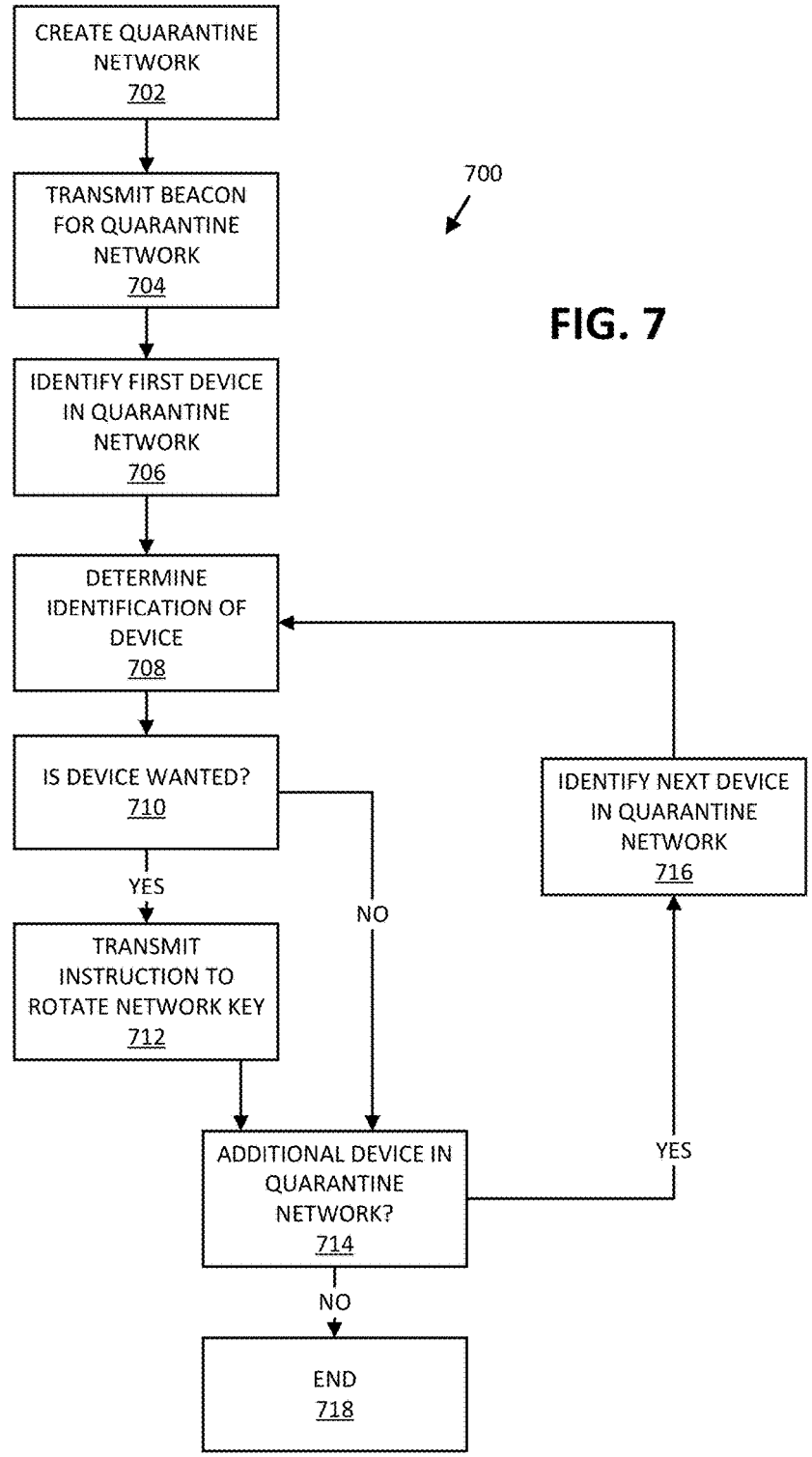
FIG. 7 is a flowchart depicting an alternative method for implementing a quarantine network in accordance with the present disclosure.
Figure 8A:
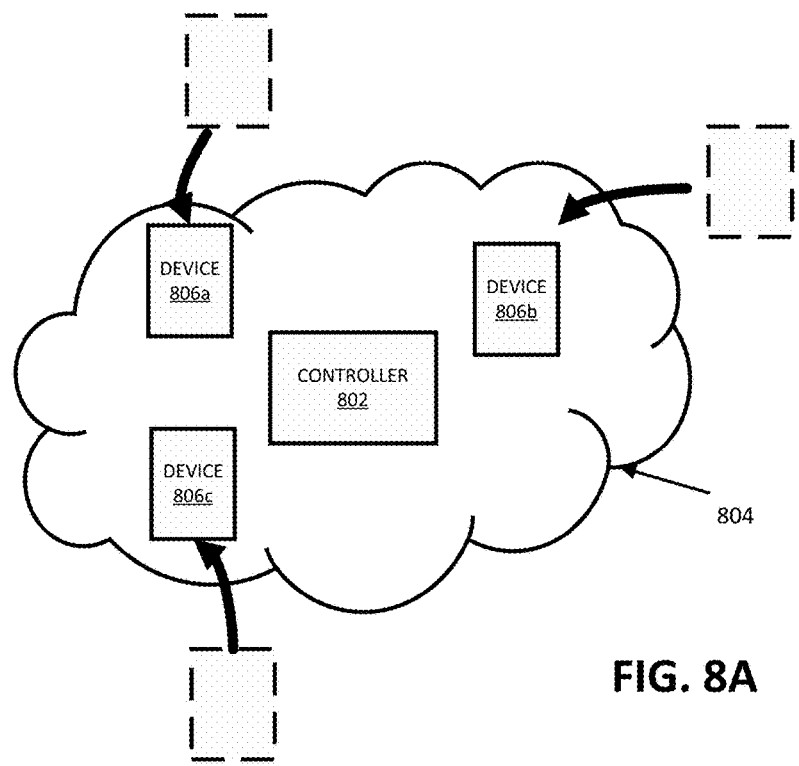
FIGS. 8A-8C are illustrations depicting components of the network as a network controller implements the method of FIG. 7.
Figure 8B:
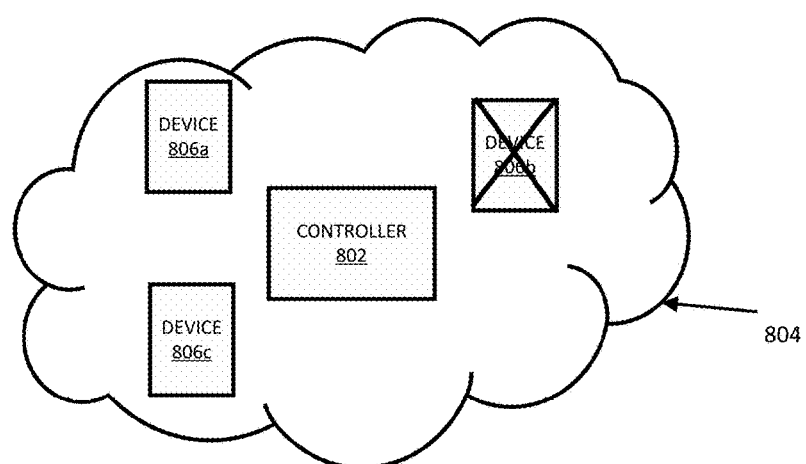
Figure 8C:
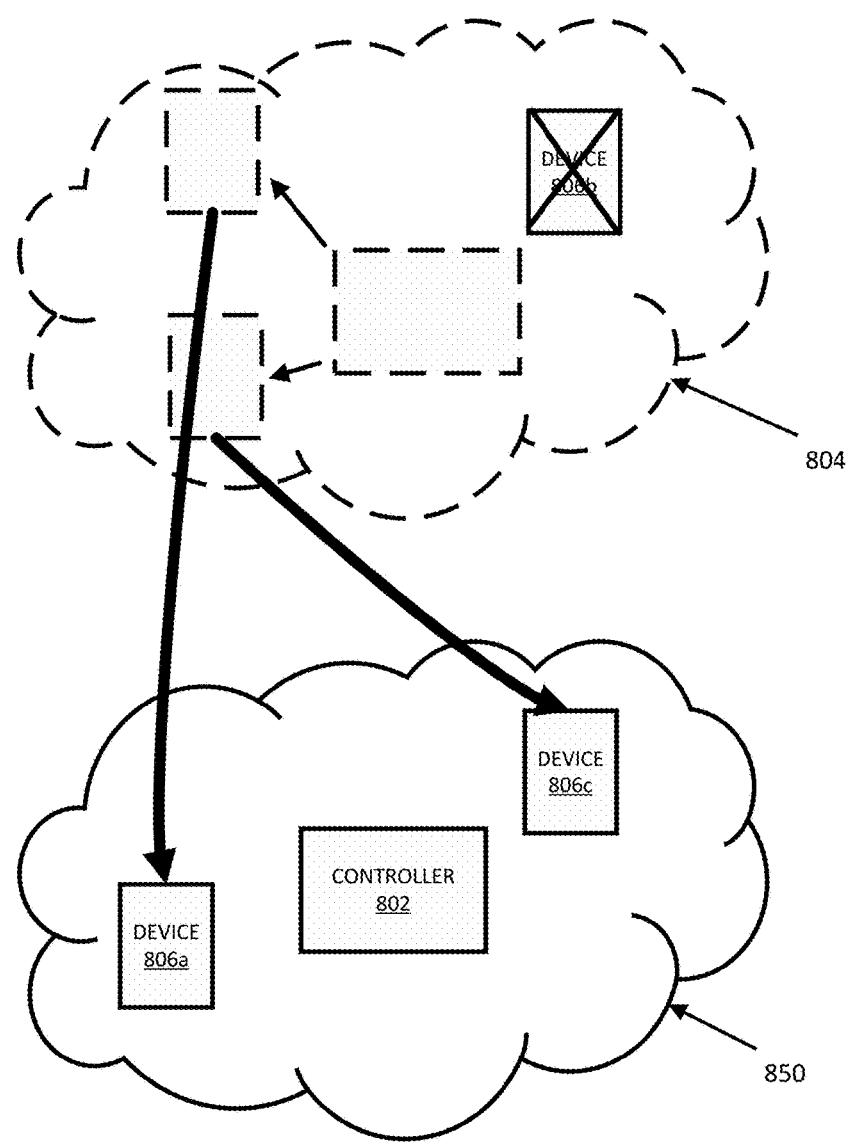

FIG. 7 is a flowchart depicting method 700 for implementing a quarantine network in accordance with the present disclosure. The method may be implemented by, for example, a network controller (e.g., controller 102 of FIG. 1). FIGS. 8A-8C are illustrations depicting components of the network as the controller implements method 700 of FIG. 7. In this example, method 700 of FIG. 7 may be implemented, for example, by controller 802 depicted in FIGS. 8A-8C.

In step 702 controller 802 first creates a quarantine network 804 to which devices may be added. This involves controller 802 identifying a suitable communication channel for network 804 and defining quarantine network 804 by specifying an identification for that network, as well as a network key (i.e., a quarantine network key) or security credential for the quarantine network 804. In a ZIGBEE network, the name of the network can be referred to as that network's PAN ID and may be a hexadecimal value identifying the network. In this example, the PAN ID for quarantine network 804 is 0x1234. Once created, the settings defining quarantine network 804 may be stored in a memory accessible to controller 802. FIG. 8A depicts quarantine network 804 having been defined by controller 802 of quarantine network 804.

Once created, controller 802 sets quarantine network 804 into a permit-join mode. The permit-join mode may last indefinitely (e.g., until an operator of network 804 cancels the permit-join mode), for a pre-determined amount of time, or until a particular trigger occurs, such as a predetermined number of devices joining or attempting to join network 804. When quarantine network 804 is in permit-join mode, devices 806 are allowed to connect to network 804. If quarantine network 804 is not in permit-join mode, controller 802 will ignore requests from devices 806 to the join quarantine network 804.

With quarantine network 804 in permit-join mode, in step 704 controller 802 broadcasts a beacon signal indicating that quarantine network 804 is in permit-join mode. Controller 802 broadcasts the beacon signal wirelessly through a suitable interface, such as a wireless or radio transceiver. The beacon signal includes an identification of quarantine network 804 (e.g., the network's PAN ID). The beacon signal may be broadcast by controller 802 without any prior communications with any of devices 806. For example, when network 804 is first placed into join mode, controller 802 may, at that time, initiate broadcast of the beacon signal. In some cases, however, controller 802 may broadcast the beacon signal in response to a request from one or more of devices 806. For example, a device 806, having recently been put into a join mode, may broadcast its own signal requesting identification of any networks within signal range that are in permit join modes. This process may be referred to as network discovery and may be performed, for example, when the device 806 is first powered on.

The beacon signal transmitted by controller 802 may be received by a number of devices 806 (e.g., ZIGBEE devices) in sufficient proximity to controller 802 to receive and decode the broadcast beacon signal. As described above, devices 806 (including devices 806a-806c) may include devices such as smart light bulbs, HVAC controllers, and the like, configured to communicate with controller 802 and participate within network 804.

Devices 806 may respond differently to the broadcast beacon signal depending upon the current state of devices 806. If, for example, a device 806 is not currently set in a mode that causes the device to join an available network (e.g., the device is not in a join mode), the device 806 may simply ignore the broadcast signal upon receipt. Conversely, if a device 806 is in join mode (i.e., the device is actively looking for networks to join), the device 806 will join network 804 upon receipt of the beacon signal. In this example, all devices 806 are in join mode. Accordingly, upon receipt of the beacon signal, devices 806 will respond by transmitting join requests to controller 802 requesting access to network 804. Accordingly, after broadcasting the beacon signal in step 704 a number of devices 806 will join network 804. This is depicted in FIG. 8A with devices 806a-806c joining (and being depicted moving into) network 804.

As part of the process of joining quarantine network, controller 802 provides devices with an initial network key for communicating via network 804. In a ZIGBEE network, the network key may be a 128-bit value used for encrypting communications between devices 806 connected to quarantine network 804 as well as with controller 802 of network 804. Typically, a number of candidate network keys are stored in a trust center (e.g., a secure memory storage location) within controller 802. At any time, the controller 802 can identify a key from the trust center to be used in communications on quarantine network 804.

At this point, a number of devices 806 have connected to network 804, but it is unknown whether all devices 806 were intended to be part of network 804 or whether some devices 806 connected unintentionally and are unwanted. As discussed above, some devices 806 may have connected unintentionally if they happened to be in a join mode when the beacon signal was broadcast by controller 802. In other cases, devices 806 may be malicious devices and may have connected to network 804 without the permission of the operator of network 804.

Accordingly, in method 700 controller 802, after turning of permit-join mode for network 804, begins to identify and characterize the devices 806 that have connected to network 804 to determine whether those devices are wanted (i.e., designated as being authorized to communicate using network 804) or unwanted devices. With that determination made, controller 802 takes appropriate action.

Specifically, in step 706 controller 802 identifies a first device (e.g., device 806a) in quarantine network 804. In step 708, that device is then interrogated to determine an identification of that device. This may involve controller 802 first inspecting its network records (e.g., a routing table) to determine a network address for device 806a. With the network addresses identified, controller 802 can begin identifying device 806a. For example, controller 502 may request from device 806a a copy of the device's application profile. As described above, the application profile provides descriptive information about device 806a, such as the type of device, as well as a description of the model and/or functionality provided by device 806a. In some cases, controller 502, as part of the identification process, may be configured to interact with device 806a to determine whether device 806a provides particular functionality. If device 806a, for example, provides functionality for modifying a temperature setting, controller 802 may be configured to determine that such a device can be identified as an HVAC controller. In an embodiment, controller 802 accesses a look-up table that relates particular device functionality to device identities. In such a case, by identifying particular functions provided by device 806a, controller 802 can map those available functions to a particular device identity in the look-up table. In some cases, controller 802 may use other techniques to identify devices 806 connected to quarantine network 804.

With the identity of device 806a determined, in step 710 controller 802 determines whether device 806a is a wanted device on network 804. In an embodiment, this step can rely upon feedback of an operator of network 804 to indicate which devices 806 are wanted and which devices 806 are unwanted. For example, controller 802 may generate a user interface displaying, for each connected device 806, a listing that shows the identity of each device 806. The user can then provide feedback through that interface to indicate which devices 806 are wanted devices. An example of such an interface is depicted in FIG. 6. Generally this step may use any approach for determining whether a particular connected device is wanted, such as any approach described above in conjunction with step 412 of FIG. 4.

In this example, device 806a is a wanted device, and so the method move to steps 712 in which controller 802 transmits an instruction to device 806a to begin using a new network key. This may involve instructing device 806a to rotate its network key by using a different key selected from the trust center. In that case, controller 802 may transmit an instruction having a destination address set to the network address of device 806a that identifies a particular network key in the trust center by identifying that key's sequence number within the trust center. Once the new network key is identified, device 806a communicates via network 804 using the new key.

By requiring device 806a to communicate with a new network key, device 806a is effectively removed from the original quarantine network 804 and placed into a new communications network 850. This is depicted in FIG. 8C that shows device 806a moving from network 804 to network 850. Both networks 804 and 850 may have the same PAN ID (i.e., 0x1234). Networks 804 and 850 may be separate networks that are individually setup and created by controller 802 as other networks would be setup. Alternatively, however, networks 804 and 850 may effectively be the same network and may only be distinguished from one another by the fact that devices connected to either network 804 or 850 are communicating using different network keys.

As controller 802 instructs wanted devices 806 in quarantine network 804 to rotate network keys, controller 802 may maintain an internal table in storage that identifies which keys are associated with wanted devices 806 within networks 804 and 850 and which network keys are associated with unwanted devices. Similarly, devices may be indicated as being in an unknown state (e.g., neither wanted or unwanted) if controller 802 has not yet processed those devices in order to determine whether they are wanted. An example of such a table that identifies the devices connected to the network, the network keys being used by those devices, and a determination of whether those devices are wanted, unwanted, or unknown is shown below in Table 3.

TABLE 3

| Device ID | Network Key | Wanted/Unwanted/Unknown |
|---|---|---|
| Device ID1 | 0x2345 | Wanted |
| Device ID2 | 0x1234 | Unwanted |
| Device ID3 | 0x1234 | Unknown |

In Table 3, device ID1 has been determined to be a wanted device and, as such, has been allocated the network key 0x2345. Conversely, device ID2 has been determined to be unwanted and, as such, is communicating using key 0x1234, which was the original key assigned to the quarantine network. Device ID3 has not yet been determined to be either wanted or unwanted and so is an unknown state. In the example Table 3, controller 802 would not communicate with device ID2 as that device has been determined to be unwanted. But, because ID3 is in an unknown state, controller 802 will communicate with device ID3 to the extent necessary to identify device ID3 and determine whether that device is wanted. Accordingly, the only communications undertaken by controller 802 using the original quarantine network key 0x1234 will involve attempts to identify unknown devices and determine whether those devices are wanted. Communications that include messages encrypted or encoded using the network key 0x2345 will be received by network controller 802, determined to be associated with a wanted device (i.e., using Table 3), and will be processed by controller 802.

Accordingly, as controller 802 instructs wanted devices 806 in quarantine network 804 to rotate network keys, controller 802 may maintain an internal table in storage that identifies which keys are associated with wanted devices 806 within networks 804 and 850 and which network keys are associated with unwanted devices. Similarly, devices may be indicated as being in an unknown state (e.g., neither wanted or unwanted) if controller 802 has not yet processed those devices in order to determine whether they are wanted may be identified in such a table maintained by controller 802.

After step 712, device 806a has been rotated on to a new network key (e.g., network key 0x2345) and controller 802 now has identified that device as a wanted device.

In step 714, controller 802 determines whether there are additional devices 806 in quarantine network 804 to inspect. If so, in step 716, controller 802 identifies the next device 806 to be processed. In this example, the next device is device 806b. As indicated, an identification of device 806b is determined in step 708 and in step 710 it is determined that device 806b is an unwanted device. As such, no further action is taken with device 806b. Device 806b continues using the original network key (i.e., 0x1234), which, per the table above has been associated with unwanted devices 806 connected to quarantine network 804.

Method 700 continues with controller 802 determining in step 714 that there is an additional device 806c to process. In step 716, controller 802 identifies the next device 806 to be processed. In this example, the next device is device 806c. As indicated, an identification of device 806c is determined in step 708 and in step 710 it is determined that device 806c is a wanted device. As such, in step 712 controller 802 transmits an instruction to device 806c to begin using a new network key (e.g., 0x2345) associated with wanted devices 806 in the above table. This may involve instructing device 806c to rotate its network key by using a different key selected from the trust center. In that case, controller 802 may transmit an instruction addressed to the network address of device 806c that identifies a particular network key in the trust center by identifying that key's sequence number within the trust center.

By requiring device 806c to communicate with a new network key, device 806c is effectively removed from the original quarantine network 804 and placed into a new communications network 850. This is depicted in FIG. 8C that shows device 806c moving from network 804 to network 850.

In step 714, controller 802 determines that there are no more devices 806 in quarantine network 804 to process and method 700 ends in step 718. At this time, network 850 (and, optionally, network 804) may be placed into a mode of operation that does not allow new devices to join either network. This prevents other unwanted devices from joining the network.

At this point, the unwanted device 806b is left attempting to communicate via network 804 using the original network key 0x1234. Upon receiving communications from device 806b, controller 802 will determine that device 806b is using a network key associated with unwanted devices and may simply ignore those communications. To make such a determination, controller 802 may look-up the network key in a mapping table (e.g., Table 3, above).

Conversely, devices 806a and 806c, which were both wanted devices are now using a new network key associated with wanted devices. This, essentially, places them in a new network 850 in that those devices are no longer able to communicate with device 806b—the unwanted device.

Method 700 depicts an iterative approach in which devices within the quarantine network 804 are sequentially identified, determined to be unwanted or wanted devices, and then the next device is identified and processed, and so on (see steps 708, 710, 712, 714, and 716). It should be understood that in an alternative embodiment, controller 802 may in a first step identify all devices connected quarantine network 804, determine which of those devices are wanted and which are unwanted and then, after identifying the group of wanted devices, instruct those devices to rotate their network keys.

In an embodiment, a system includes a first ZIGBEE device, a second ZIGBEE device, and a ZIGBEE network controller. The ZIGBEE network controller is configured to transmit a first beacon signal identifying a first personal area network, determine that the first ZIGBEE device and the second ZIGBEE device have connected to the first personal area network, and receive a first transmission from the first ZIGBEE device including a manufacturer identification and a product description for the first ZIGBEE device. The ZIGBEE network controller is configured to determine, using the first transmission, that the first ZIGBEE device is designated as being authorized to communicate using the first personal area network, receive a second transmission from the second ZIGBEE device including a second manufacturer identification and a second product description for the second ZIGBEE device, and determine, using the second transmission, that the second ZIGBEE device is not designated as being authorized to communicate using the first personal area network. The ZIGBEE network controller is configured to selectively instruct the first ZIGBEE device to leave the first personal area network, cease communications with the second ZIGBEE device. The second ZIGBEE device continues to be connected to the first personal area network. The ZIGBEE network controller is configured to transmit a second beacon signal identifying a second personal area network, determine that the first ZIGBEE device has connected to the second personal area network, determine that the first ZIGBEE device is designated as being authorized to communicate using the second personal area network, and instruct the first ZIGBEE device to use a network key for communications with the ZIGBEE network controller.

In another embodiment, a method includes identifying a plurality of devices that are connected to a first personal area network, determining that a first device of the plurality of devices is designated as being authorized to communicate using the first personal area network, and determining that a second device of the plurality of devices is designated as not being authorized to communicate using the first personal area network. The method includes instructing the first device to disconnect from the first personal area network, and ceasing communication with the second device. After ceasing communication with the second device, the second device continues to be connected to the first personal area network.

In another embodiment, a method includes determining that a plurality of ZIGBEE devices are communicatively coupled to a personal area network, identifying a first set of ZIGBEE devices, of the plurality of ZIGBEE devices, that are designated as being authorized to communicate using the personal area network, and identifying a second set of ZIGBEE devices, of the plurality of ZIGBEE devices, that are not designated as being authorized to communicate using the personal area network. The method includes instructing each device in the first set of ZIGBEE devices to use a network key, and ceasing communications with each device in the second set of ZIGBEE devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. The PAN configuration and ZIGBEE implementation described herein is introduced as an example embodiment. However, it shall be understood that the quarantine network implementation described herein may apply to any communications network in which devices are configured to detect a beacon signal and join a communications network identified by that beacon signal. In such a system, a quarantine network configuration in accordance with the present disclosure may be utilized as a staging network to identify wanted and unwanted devices and transition the wanted devices into a semi-permanent network, while leaving the unwanted devices stranded on the quarantine network.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, comprising:
   a first ZIGBEE device;
   a second ZIGBEE device; and
   a ZIGBEE network controller configured to:
   transmit a first beacon signal identifying a first personal area network,
   determine that the first ZIGBEE device and the second ZIGBEE device have connected to the first personal area network,
   receive a first transmission from the first ZIGBEE device including a manufacturer identification and a product description for the first ZIGBEE device,
   determine, using the first transmission, that the first ZIGBEE device is designated as being authorized to communicate using the first personal area network,
   receive a second transmission from the second ZIGBEE device including a second manufacturer identification and a second product description for the second ZIGBEE device,
   determine, using the second transmission, that the second ZIGBEE device is not designated as being authorized to communicate using the first personal area network,
   selectively instruct the first ZIGBEE device to leave the first personal area network, cease communications with the second ZIGBEE device, wherein the second ZIGBEE device continues to be connected to the first personal area network, transmit a second beacon signal identifying a second personal area network, determine that the first ZIGBEE device has connected to the second personal area network, determine that the first ZIGBEE device is designated as being authorized to communicate using the second personal area network, and instruct the first ZIGBEE device to use a network key for communications with the ZIGBEE network controller.

2. The system of claim 1, wherein the ZIGBEE network controller is configured to determine that no devices have connected to the second personal area network that are not designated as being authorized to communicate using the second personal area network.

3. The system of claim 1, wherein the ZIGBEE network controller is configured to, before transmitting the second beacon signal, modify the first personal area network to prevent ZIGBEE devices from connecting to the first personal area network.

4. The system of claim 1, wherein the ZIGBEE network controller is configured to determine that the first ZIGBEE device is designated as being authorized to communicate using the first personal area network by:
transmitting a description including the manufacturer identification and the product description of the first ZIGBEE device to a computer system; and
receiving, from the computer system, an indication that the first ZIGBEE device is designated as being authorized to communicate using the first personal area network.

5. A method, comprising:
identifying a plurality of devices that are connected to a first personal area network;
determining that a first device of the plurality of devices is designated as being authorized to communicate using the first personal area network;
determining that a second device of the plurality of devices is designated as not being authorized to communicate using the first personal area network;
instructing the first device to disconnect from the first personal area network; and
ceasing communication with the second device, wherein, after ceasing communication with the second device, the second device continues to be connected to the first personal area network.

6. The method of claim 5, further comprising:
determining the first device is connected to a second personal area network;
determining that the first device is designated as being authorized to communicate using the second personal area network; and
instructing the first device to use a network key for communications with a network controller.

7. The method of claim 6, further comprising determining that no devices have connected to the second personal area network that are not designated as being authorized to communicate using the second personal area network.

8. The method of claim 6, further comprising, before determining the first device is connected to a second personal area network, preventing new devices from connecting to the first personal area network.

9. The method of claim 6, wherein a personal area network identification of the first personal area network is equal to a personal area network identification of the second personal area network.

10. The method of claim 5, wherein determining that the first device of the plurality of devices is designated as being authorized to communicate using the first personal area network comprises:
transmitting a description of the first device to a remote computer system; and
receiving, from the remote computer system, an indication that the first device is designated as being authorized to communicate using the first personal area network.

11. The method of claim 10, further comprising:
determining a media access control address of the first device; and
determining the description of the first device using the media access control address.

12. The method of claim 10, further comprising receiving a transmission from the first device including the description of the first device, the description of the first device identifying a manufacturer of the first device.

13. A method, comprising:
determining that a plurality of ZIGBEE devices are communicatively coupled to a personal area network;
identifying a first set of ZIGBEE devices, of the plurality of ZIGBEE devices, that are designated as being authorized to communicate using the personal area network;
identifying a second set of ZIGBEE devices, of the plurality of ZIGBEE devices, that are not designated as being authorized to communicate using the personal area network;
instructing each device in the first set of ZIGBEE devices to use a network key; and
ceasing communications with each device in the second set of ZIGBEE devices.

14. The method of claim 13, wherein identifying the first set of ZIGBEE devices that are designated as being authorized to communicate using the personal area network comprises:
transmitting a description of a first ZIGBEE device in the first set of ZIGBEE devices to a remote computer system; and
receiving, from the remote computer system, an indication that the first ZIGBEE device is designated as being authorized to communicate using the personal area network.

15. The method of claim 14, further comprising:
determining a media access control address of the first ZIGBEE device; and
determining the description of the first ZIGBEE device using the media access control address.

16. The method of claim 14, further comprising receiving a transmission from the first ZIGBEE device including the description of the first ZIGBEE device, the description of the first ZIGBEE device identifying a manufacturer of the first ZIGBEE device.

17. The method of claim 14, further comprising, before receiving the indication that the first ZIGBEE device is designated as being authorized to communicate using the personal area network causing the first ZIGBEE device to display a code, and wherein the description of the first ZIGBEE device includes the code.

18. The method of claim 13, further comprising, after identifying the first set of ZIGBEE devices, preventing ZIGBEE devices from connecting to the personal area network.

19. The method of claim 18, wherein, after ceasing communications with each device in the second set of ZIGBEE devices, each device in the second set of ZIGBEE devices continues to be connected to the personal area network.

20. The method of claim 13, further comprising:
  receiving a message; and
  determining that the message was received from a ZIGBEE device in the first set of ZIGBEE devices by determining that the message is encrypted using the network key.

* * * * *